Patented July 15, 1947

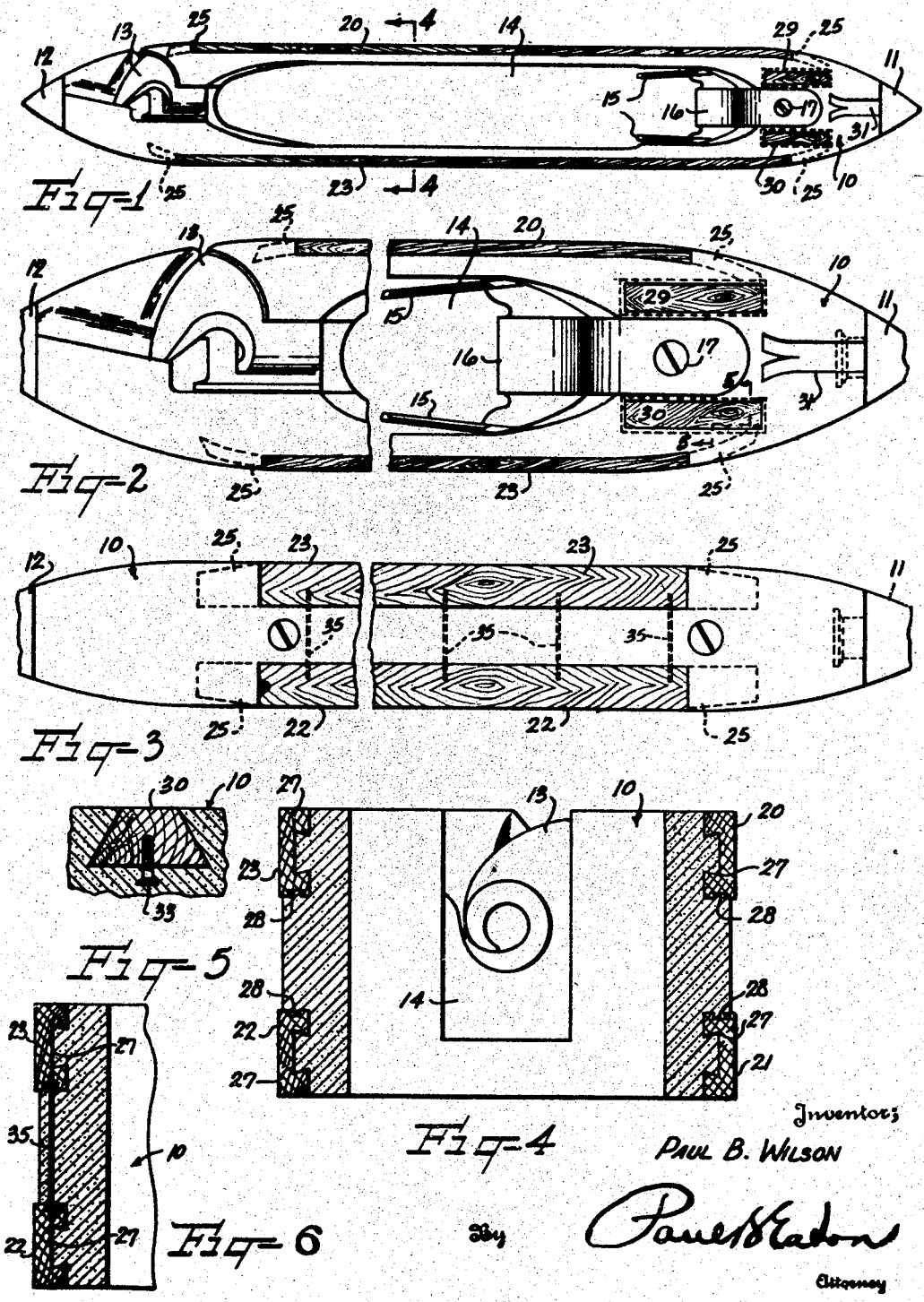

2,423,917

UNITED STATES PATENT OFFICE 2,423,917

PLASTIC SHUTTLE

Paul B. Wilson, Portland, Oreg., assignor to Harold D. Wolgamot, Portland, Oreg.

Application July 5, 1945, Serial No. 603,336

6 Claims. (Cl. 139—196)

This invention relates to a shuttle for use in looms and more especially to a plastic shuttle.

It is an object of this invention to provide a plastic shuttle made of plastic material and molded into proper form, the plastic used being preferably "Tenite" which is a cellulose acetobutyrate product. It is of a yellowish translucent color and is admirably adapted for molding into shuttles.

It is another object of this invention to provide a shuttle for looms molded from plastic material and having wear strips of other material such as wood molded thereinto.

It is another object of this invention to provide a shuttle molded from plastic material and having wear strips secured along the upper and lower edges of each side thereof and extending to and curving into and being covered by a portion of the nose of the shuttle, together with additional wear strips if desired at the ends of the shuttle and on the upper side thereof.

It is another object of this invention to provide a plastic shuttle for looms having wear strips of wood or other material differing in characteristic from the plastic material for absorbing the wear or friction in the box of the loom. Plastic might have a tendency to stick due to the friction of the binder and the box front in boxing the shuttle at each end of the lay of the loom. Therefore, I have shown wooden strips projecting slightly beyond the sides of the shuttle for absorbing this wear.

Heretofore, shuttles for looms have been made of wood and, due to the fact that the density of wood varies in different portions of a block of wood, it is absolutely impossible to provide a perfectly balanced shuttle even though it is truely shaped and has the proper dimensions throughout from end to end. By providing a plastic shuttle, it can be manufactured more cheaply and more quickly than a wooden shuttle because in making a wooden shuttle, carefully selected material must be used and the workmanship employed in shaping the piece of wood into a shuttle involves not only highly skilled labor but also a great amount of time fabricating the shuttle ready for use. In addition, many mills have equipped themselves with shuttle truing machines for reshaping and retrimming the shuttles with a view to balancing the same; but all have been unsuccessful due to the varying in the density of the wood failing to give a perfectly balanced shuttle.

Furthermore, by the use of a plastic shuttle, when it does have to be discarded, it can be melted down and used over again; whereas, in the case of a wooden shuttle, it has no salvage value whatever.

By providing a plastic shuttle, a shuttle is provided which is uniform in weight and size and not only is harder to dent or damage by blows but also by employing a plastic such as "Tenite," it has a tendency to heal; that is, a dent made in it will, within the course of one or two days or even sooner, have a tendency to disappear, due to the peculiar character of this type of plastic.

By providing the hardwood strips at each of the four corners of the shuttle in cross-section and extending over all portions of the shuttle which engages the binder and box front of a loom, the wear on the plastic is eliminated as the wooden strips absorb all the wear from boxing of the shuttle.

These strips of wood are raised above the surface of the plastic to allow air space between the shuttle body and the shuttle box which prevents the plastic from sticking or crawling in the shuttle box.

The wear strips of wood are preferably made along the grain so that there is no cross-grain, and this wood is molded into the plastic by dovetailing, by embedding the tip of screws in the wood and having the butts of the screws embedded in the plastic which is molded to the strips, which provides a unitary structure in which the wood strips cannot be separated from the plastic body.

The end of the shuttle which is disposed next to the battery end of the loom during a transfer operation is provided with hardwood pins setting endwise thus saving the plastic from the jar that comes from the battery during a transfer operation and also protects the plastic from wear.

The points of the shuttle are provided with small heads which are also knurled and the plastic is molded around the knurled portions of these heads and this prevents the points from coming loose, as the plastic is cast around the knurled heads under pressure.

The plastic shuttle has molded thereinto a standard eye or threading device which is standard equipment and need not be described.

Some of the objects of the invention having been stated, other objects will appear as the description proceeds when taken in connection with the accompanying drawings in which:

Figure 1 is a top plan view of an improved loom shuttle;

Figure 2 is a view similar to Figure 1 but on a larger scale and having the central portion of the shuttle broken away;

Figure 3 is a side elevation of the shuttle looking from the lower side of Figure 2 but showing a portion of the noses of the shuttle broken away;

Figure 4 is a cross sectional view taken along the line 4—4 in Figure 1;

Figure 5 is a cross sectional detail view taken along the line 5—5 in Figure 2;

Figure 6 is a cross sectional view similar to the left hand portion of Figure 4 and showing reenforcing wires therein.

Referring more specifically to the drawings the numeral 10 indicates a plastic shuttle having metallic noses 11 and 12 at each end thereof usually known as the nose points or noses of the shuttle. The shuttle has a conventional shuttle eye 13 molded near one end thereof and has an elongated cavity 14 in which a bobbin or cop or quill is adapted to be disposed. The shuttle is also provided with a conventional forked spring clip having prongs 15 with internal vertically disposed grooves, not shown, for receiving a bobbin transferred into the shuttle which also ejects the old bobbin from the shuttle at the same operation.

This shuttle is also equipped with a metallic member 16 which is secured to the plastic body by means of a suitable bolt 17 which is conventional. The plastic body of the shuttle has four longitudinally extending wear strips 20, 21, 22, and 23 near the upper and lower edges thereof and extending from near one end of the shuttle to the other, and at each end of the shuttle as at 25, these wooden strips are directed into the plastic portion and the ends are completely covered by the plastic material which is molded therearound. The wooden strips are each provided with longitudinally extending dovetail grooves on their inner surfaces, the grooves indicated at 27 on their inner surfaces and also the proximate surfaces thereof have grooves 28 into which the plastic material is molded. A suitable mold is provided into which the bobbin holder 15, metallic member 16, the shuttle eye 13 are positioned, as well as the wooden strips 20 to 23, inclusive, and also the wooden strips 29 and 30 and the wooden strips 31 are positioned and then the plastic material is poured into the mold and molded around all of the above-named objects and this is molded under pressure so that when the mold is removed, the completed shuttle as shown in the drawings is provided.

The strips 29 and 30 are provided on the top of the shuttle to provide wear strips and they are secured in position by strips of wood being dovetailed in cross section; that is, being broader at the bottom than at the top, and the plastic material is molded therearound. If desired, all of the wooden strips can have small screws 33 screwed thereinto for a small distance with the heads left protruding and the plastic material is molded around the heads of the screws which assist in holding the wooden strips in position, although the dovetailing will hold them in position and the screws may not be necessary.

Each end of the hardwood strips 20 to 23, inclusive, is bent inwardly from the sides of the shuttle as at 25 and is beveled away from the top and bottom edges of the shuttle so that they are completely embedded in the plastic at each end thereof.

There is also provided, if desired, a plurality of wires 35 whose ends are embedded in the proximate edges of the wear strips 20 to 23 inclusive as shown in Figures 3 and 6.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A loom shuttle having its body portion molded from plastic material and having wear strips of a different material affixed to its upper and lower edges at each side thereof and having their ends projecting into the body portion.

2. A loom shuttle having its main body portion molded from cellulose aceto-butyrate and having wear strips of wood embedded in and secured to the upper and lower side edges of the shuttle and projecting a slight distance beyond the outer plastic walls of the shuttle.

3. A loom shuttle having its main body portion molded from cellulose aceto-butyrate and having wear strips of wood embedded in and secured to the upper and lower side edges of the shuttle and projecting a slight distance beyond the outer plastic walls of the shuttle, the ends of the wooden strips being curved inwardly and completely covered by the plastic material.

4. A loom shuttle molded from cellulose acetobutyrate and having wooden wear strips secured to the upper and lower outer edges thereof and extending along both sides of the shuttle and having the ends projecting inwardly and completely embedded within the cellulose aceto-butyrate body portion.

5. A loom shuttle molded from cellulose acetobutyrate and having wooden wear strips secured to the upper and lower outer edges thereof and extending along both sides of the shuttle and having the ends projecting inwardly and completely embedded within the cellulose aceto-butyrate body portion, the nose of the shuttle having additional wear strips embedded therein and held in position by having the cellulose aceto-butyrate securely molded therearound.

6. In a loom shuttle having its body portion molded from cellulose aceto-butyrate plastic and having wear strips embedded in the upper and lower side edges of the body portion of the shuttle and extending from near one end of the shuttle to the other end and having the ends completely covered by the plastic material, said wear strips having dovetailed portions in their surfaces which adjoin the plastic material whereby the plastic material is molded into the dovetailed slots in the wear strips to securely affix the wear strips to the body portion of the shuttle.

PAUL B. WILSON.

REFERENCES CITED

The following references are of record in the file of this patent:

UNITED STATES PATENTS

| Number | Name | Date |
| --- | --- | --- |
| 1,805,090 | Hills | May 21, 1931 |
| 2,035,914 | Olsen | Mar. 31, 1936 |

FOREIGN PATENTS

| Number | Country | Date |
| --- | --- | --- |
| 21,144 | Great Britain | 1902 |
| 6,798 | Great Britain | 1889 |
| 502,120 | Great Britain | Mar. 13, 1939 |